(12) United States Patent
Chang et al.

(10) Patent No.: US 8,982,049 B2
(45) Date of Patent: Mar. 17, 2015

(54) INTERACTIVE SIMULATED-GLOBE DISPLAY SYSTEM

(71) Applicants: Chun-Yen Chang, Taipei (TW); Wei-Kai Liou, Taipei (TW)

(72) Inventors: Chun-Yen Chang, Taipei (TW); Wei-Kai Liou, Taipei (TW)

(73) Assignee: National Taiwan Normal University, Taipei (TW)

( * ) Notice: Subject to any disclaimer, the term of this patent is extended or adjusted under 35 U.S.C. 154(b) by 127 days.

(21) Appl. No.: 13/886,626

(22) Filed: May 3, 2013

(65) Prior Publication Data

US 2014/0092017 A1    Apr. 3, 2014

(30) Foreign Application Priority Data

Sep. 28, 2012  (TW) .............................. 101135684 A

(51) Int. Cl.
   *G09G 5/00*    (2006.01)
(52) U.S. Cl.
   CPC ..................................... *G09G 5/006* (2013.01)
   USPC ......................................................... 345/158

(58) Field of Classification Search
   None
   See application file for complete search history.

(56) References Cited

U.S. PATENT DOCUMENTS

| | | | |
|---|---|---|---|
| 5,422,987 A * | 6/1995 | Yamada | ......................... 345/427 |
| 7,382,399 B1 * | 6/2008 | McCall et al. | ........... 348/207.99 |
| 2010/0053325 A1 * | 3/2010 | Inagaki | .......................... 348/143 |

* cited by examiner

*Primary Examiner* — David D Davis
(74) *Attorney, Agent, or Firm* — Thomas | Horstemeyer, LLP

(57) ABSTRACT

The invention discloses an interactive simulated-globe display system including an imaging body, N image-projecting units, a data processing unit, an optical pointer, and M image-capturing units where N and M are respectively a natural number. The N image-projecting units project N images onto an external hemispheric surface of the imaging body. The N images constitute a hemi-globe image of a whole globe image. The data processing unit detects an indicated spot projected on the external hemispheric surface by the M image-capturing units, judges if a track relative to the indicated spot meets one of a plurality of position input rules, and if YES, executes an instruction corresponding to said one position input rule.

10 Claims, 3 Drawing Sheets

INTERACTIVE SIMULATED-GLOBE DISPLAY SYSTEM

CROSS-REFERENCE TO RELATED APPLICATION

This utility application claims priority to Taiwan Application Serial Number 101135684, filed Sep. 28, 2012, which is incorporated herein by reference.

BACKGROUND OF THE INVENTION

1. Field of the Invention

This present invention relates to a simulated-globe display system, and more particularly, to an interactive simulated-globe display system.

2. Description of the Prior Art

In schools, planetariums, museums and other education institutions, various sizes of earth or star globes are often used as teaching aids for formal or informal education teaching field. In recent years, as technologies progress, some inventors have attempted to project images, generated by earth simulation software or other star simulation software, onto screens as digital teaching auxiliary aids.

Current display system simulating earth or star globes by three-dimensional image projection technology will be described as follows. One prior art, such as disclosed in U.S. Patent Pub. No. 2006/0256302, utilizes multiple projectors disposed at different positions to synchronously project respective images in different orientations on a sphere. Each image projected by the corresponding projector represents an image of a specific region on the sphere, and all images on the sphere are pieced together into a complete surface projection image.

Another prior art uses a three-dimensional internal back projection way. The prior art projects coherent light rays from a coherent light source onto an inner surface of a three-dimensional projection surface. A compact image can thereby be formed and seen by a viewer from outside the properly constructed three-dimensional projection surface. The prior art can be practiced to show examples of things that can be represented on such a surface are celestial bodies and planets like the Earth or other stars. The prior art is described in details in U.S. Pat. No. 8,066,378.

Another prior art relates to a three-dimensional convex surface display system which has a display surface of a three-dimensional convex shape. The projection system in the display system projects a medium image to an object field through lens system onto a continuous image field located on the interior of the display surface to provide the image simulating star globes. The prior art is described in details in U.S. Pat. No. 7,352,340.

Another prior art relates to three-dimensional internal projection system which projects an image in optical scanning or projection ways onto an inner surface of a large three-dimensional object such that viewers from outside watch the image with stereoscopic imaging effect. The prior art is described in details in U.S. Patent Pub. No. 2009/0027622.

Due to complicated architecture and high cost, current display system simulating earth or star globes are unfavorable to employing simple equipment to implement. For example, current display system simulating earth or star globes cannot employ common computers and single rifle projectors in classrooms to implement. In addition, none of the prior arts provides viewers with function of control and interaction, and so viewers watch the static three-dimensional image generated by the prior arts and having imaging blind spot.

SUMMARY OF THE INVENTION

Accordingly, a scope of the invention is to provide an interactive simulated-globe display system which has simple architecture and low cost. The interactive simulated-globe display system of the invention benefits to using the simple equipment to implement, and can interact with an operator and let viewers feel there is no imaging blind spot of formation of the three-dimensional image.

According to the first preferred embodiment of the invention, an interactive simulated-globe display system includes an imaging body, N image-projecting units, a data processing unit, an optical pointer and M image-capturing units where N and M are respectively a natural number. The imaging body has an external hemispheric surface. The data processing unit is capable of communicating with the N image-projecting units, and functions in projecting N images onto the external hemispheric surface of the imaging body through the N image-projecting units where the N images constitute a hemi-globe image of a whole globe image. The data processing unit therein stores a plurality of first instructions and a plurality of position input rules which each corresponds to one of the first instructions. The optical pointer functions in projecting an indicated spot onto the external hemispheric surface of the imaging body. The M image-capturing units are capable of communicating with the data processing unit. The data processing unit detects the N images and the indicated spot projected on the hemispheric surface of the imaging body by the M image-capturing units, determines a spherical coordinate of the indicated spot on the basis of the N images, converts the spherical coordinate of the indicated spot into a plane coordinate, detects a track relative to the plane coordinate of the indicated spot at an interval, judges if the track meets one of the position input rules, and if YES, executes the first instruction corresponding to said one position input rule.

Further, the interactive simulated-globe display system according to the first preferred embodiment of the invention also includes a wireless instruction transmitting unit. The wireless instruction transmitting unit is integrated with the optical pointer, and is for transmitting a second instruction to the data processing unit in a wireless transmission way.

In one embodiment, the indicated spot is a laser spot.

In one embodiment, the M image-capturing units are externally connected to or built in the data processing unit.

According to the second preferred embodiment of the invention, an interactive simulated-globe display system includes a translucent hemispheric shell, N image-projecting units, a data processing unit, an optical pointer and M image-capturing units where N and M are respectively a natural number. The data processing unit is capable of communicating with the N image-projecting units, and functions in projecting N images onto an inner surface of the translucent hemispheric shell through the N image-projecting units where the N images constitute a hemi-globe image of a whole globe image. The data processing unit therein stores a plurality of first instructions and a plurality of position input rules which each corresponds to one of the first instructions. The optical pointer functions in projecting an indicated spot onto an external surface of the translucent hemispheric shell. The M image-capturing units are capable of communicating with the data processing unit. The data processing unit detects the N images and the indicated spot projected on the translucent hemispheric shell by the M image-capturing units, determines a spherical coordinate of the indicated spot on the basis of the N images, converts the spherical coordinate of the indicated spot into a plane coordinate, detects a track relative to the plane coordinate of the indicated spot at an interval, judges if the track meets one of the position input rules, and if YES, executes the first instruction corresponding to said one position input rule.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
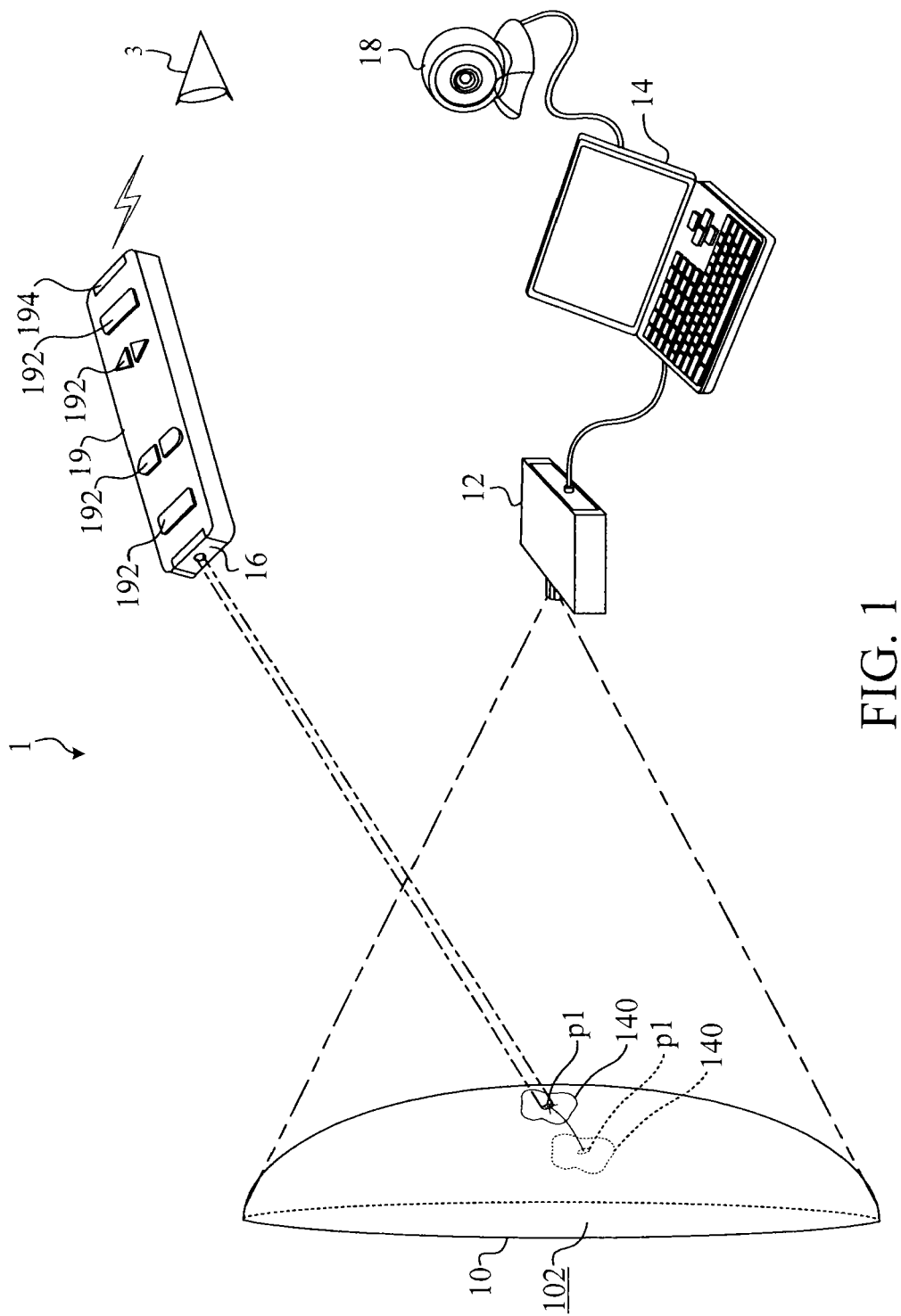
FIG. 1 is a schematic diagram showing the architecture of the interactive simulated-globe display system according to the first preferred embodiment of the invention.

Referring to FIG. 1, FIG. 1 schematically shows the architecture of the interactive simulated-globe display system 1 according to the first preferred embodiment of the invention.

As shown in FIG. 1, the interactive simulated-globe display system 1 includes an imaging body 10, N image-projecting units 12, a data processing unit 14, an optical pointer 16 and M image-capturing units 18 where N and M are respectively a natural number. The imaging body 10 has an external hemispheric surface 102. To illustrate conveniently, only one image-projecting units 12 and one image-capturing units 18 are shown for representation.

In practical application, the imaging body 10 can be a solid spheroid, a solid hemispheroid, a whole spherical shell or a hemispheric shell. The data processing unit 14 can be a desktop computer, a notebook computer, a tablet computer, a personal digital assistant, a mobile phone or other apparatus with computation capability. The data processing unit 14 therein stores a plurality of first instructions (such as an instruction for rotating image) and a plurality of position input rules which each corresponds to one of the first instructions.

The data processing unit 14 is capable of communicating with the N image-projecting units 12. The data processing unit 14 functions in projecting N images onto the external hemispheric surface 102 of the imaging body 10 through the N image-projecting units 12. The N images constitute a hemi-globe image of a whole globe image. For example, single image projected by single image-projecting unit 12 constitutes the eastern hemisphere's image of the earth globe image. In practical application, the whole globe image can be generated by star simulation software executed in the data processing unit 14. Distinguishable from the prior arts, as the size of the imaging body 10 changes, the interactive simulated-globe display system 1 of the invention can be implemented only by adjusting focus and number of the image-projecting units 12 to project and constitute the hemi-globe image on the external hemispheric surface 102 of the imaging body 10, but the display system simulating earth or star globes with high cost of the prior arts must be made renewedly.

The optical pointer 16 functions in projecting an indicated spot p1 onto the external hemispheric surface 102 of the imaging body 10.

In one embodiment, the indicated spot p1 is a laser spot.

The M image-capturing units 18 are capable of communicating with the data processing unit 14.

In one embodiment, the M image-capturing units 18 are externally connected to or built in the data processing unit 14. For example, as shown in FIG. 1, the image-capturing unit 18 is physically connected to the data processing unit 14.

Figure 2:
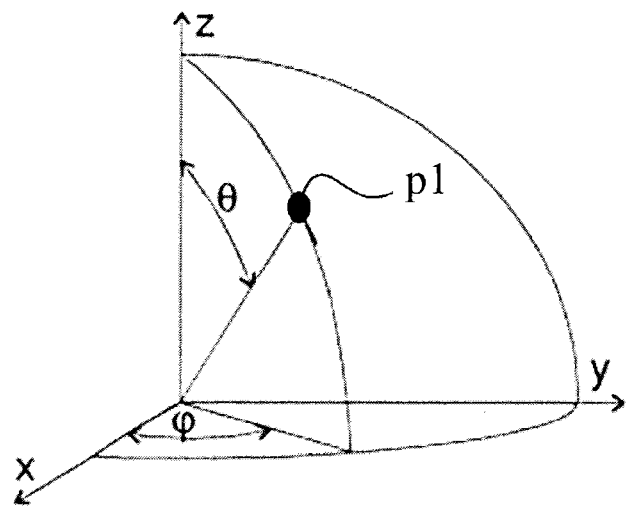
FIG. 2 is a diagram showing definition of conversion performed in the data processing unit of the invention between plane coordinates and spherical coordinates.

The data processing unit 14 detects the N images and the indicated spot p1 projected on the hemispheric surface 102 of the imaging body 10 by the M image-capturing units 18. The data processing unit 14 determines a spherical coordinate of the indicated spot p1 on the basis of the N images, and converts the spherical coordinate of the indicated spot p1 into a plane coordinate. The definition of conversion between the plane coordinate and the spherical coordinate is illustrated in FIG. 2, the formula of the spherical coordinate $(r, \theta, \phi)$ convert into the plane coordinate $(x,y,z)$ as follow:

$$x = r \sin \theta \cos \phi$$

$$y = r \sin \theta \sin \phi$$

$$z = r \cos \theta$$

Figure 3:
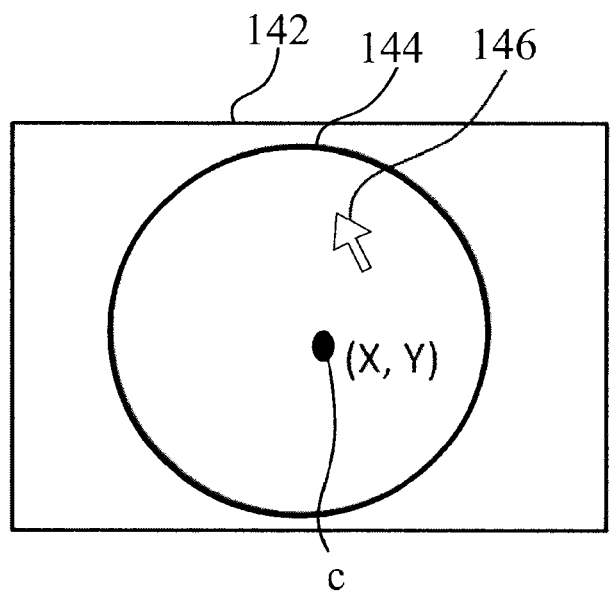
FIG. 3 is a schematic diagram showing an example of the display of the data processing unit of the invention on which a two-dimensional hemispheric image, an indicated spot and a cursor are displayed.

FIG. 3 schematically illustrates the indicated point c, converted from the spherical coordinate into the plane coordinate of the indicated spot p1, displayed on the display 142 of the data processing unit 14. The display 142 in FIG. 3 also displays an example of a two-dimensional hemispheric image 144 and a cursor 146.

The data processing unit 14 detects a track relative to the plane coordinate of the indicated spot p1 at an interval, judges if the track meets one of the position input rules, and if YES, executes the first instruction corresponding to said one position input rule. For example, as shown in FIG. 1, the N images constitute the hemispheric image of the earth globe image, the data processing unit 14 judges that moving rightwards of the indicated spot p1 meets the instruction of requesting rotating the earth globe image eastwards, at this time, the N images start changing to simulate the image showing eastward rotation of the earth globe image where the object 140 of the hemispheric image in FIG. 1 moves rightwards together with the hemispheric image. Thereby, the interactive simulated-globe display system 1 of the invention can make an operator 3 interact with the software executed in the data processing unit 14 to simulate globe image, and further let viewers feel there is no imaging blind spot of formation of the spherical image.

The first instructions also include an instruction of requesting moving the cursor simultaneously with the indicated spot. As shown in FIG. 3, when the data processing unit 14 judges that the indicated spot p1 does not move at an interval and that a distant exists between the indicated point c and the cursor 146, the data processing unit 14 thereupon moves the cursor 146 to the indicated point c.

Further, as shown in FIG. 1, the interactive simulated-globe display system 1 according to the first preferred embodiment of the invention also includes a wireless instruction transmitting unit 19. The wireless instruction transmitting unit 19 is integrated with the optical pointer 16, and is for transmitting a second instruction to the data processing unit 14 in a wireless transmission way. For example, the wireless instruction transmitting unit 19 as shown in FIG. 1 also includes a plurality of function keys 192 which each corresponds to one of the second instructions. The wireless instruction transmitting unit 19 also includes a switch in charge of permanently turning on the optical indicator 16. The wireless instruction transmitting unit 19 also includes a wireless signal transmitting module 194. When the operator pushes one of the function keys 192 on the wireless instruction transmitting unit 19, the wireless instruction transmitting unit 19 transmits the corresponding second instruction to the data processing unit 14 through the wireless signal transmitting module 194. Thereby, the interactive simulated-globe display system 1 of the invention can make the operator variously interact with the software executed in the data processing unit 14 to simulate globe image, e.g., selecting, pulling, zooming-in, zooming-out, rotating or other instructions for objects in the image, or executing left, right key function of the mouse.

With the aforesaid first instruction which makes the cursor 146 in the image simultaneously with the indicated spot p1 and then with one of the second instructions, the operator can operate objects in the image just like operation of objects on a general computer, e.g., selecting, pulling, zooming-in, zooming-out, rotating or other operation for objects in the image on which the cursor 146 is located. For example, at first, the operator directs the indicated spot p1 to an area on the spherical image, so that the data processing unit 14 executes one of the first instructions to move the cursor 146 to the area which the indicated spot p1 is directed to. Then, the operator can push one of the function keys 192 on the wireless instruction transmitting unit 19, so that the data processing unit 14 executes the second instruction or executes the first instruction and the second instruction at the same time to perform the function which the operator wants, e.g., popping out the information relative to the area, zooming in or zooming out the area, or pulling the area by the indicated spot p1, etc.

As shown in FIG. 1, with respect to the imaging body 10, the viewer 3 watches the external hemispheric surface 102 of the imaging body 10 at the same side as the image-projecting unit 12. Thereby, the interactive simulated-globe display system 1 of the invention can project the image, which the viewer 3 feel an whole sphere image without imaging blind spot, without the need of the three-dimensional spherical shell.

In one embodiment, the wireless transmission way used by the wireless instruction transmitting unit 19 can be a Bluetooth transmission way or an infrared transmission way.

Figure 4:
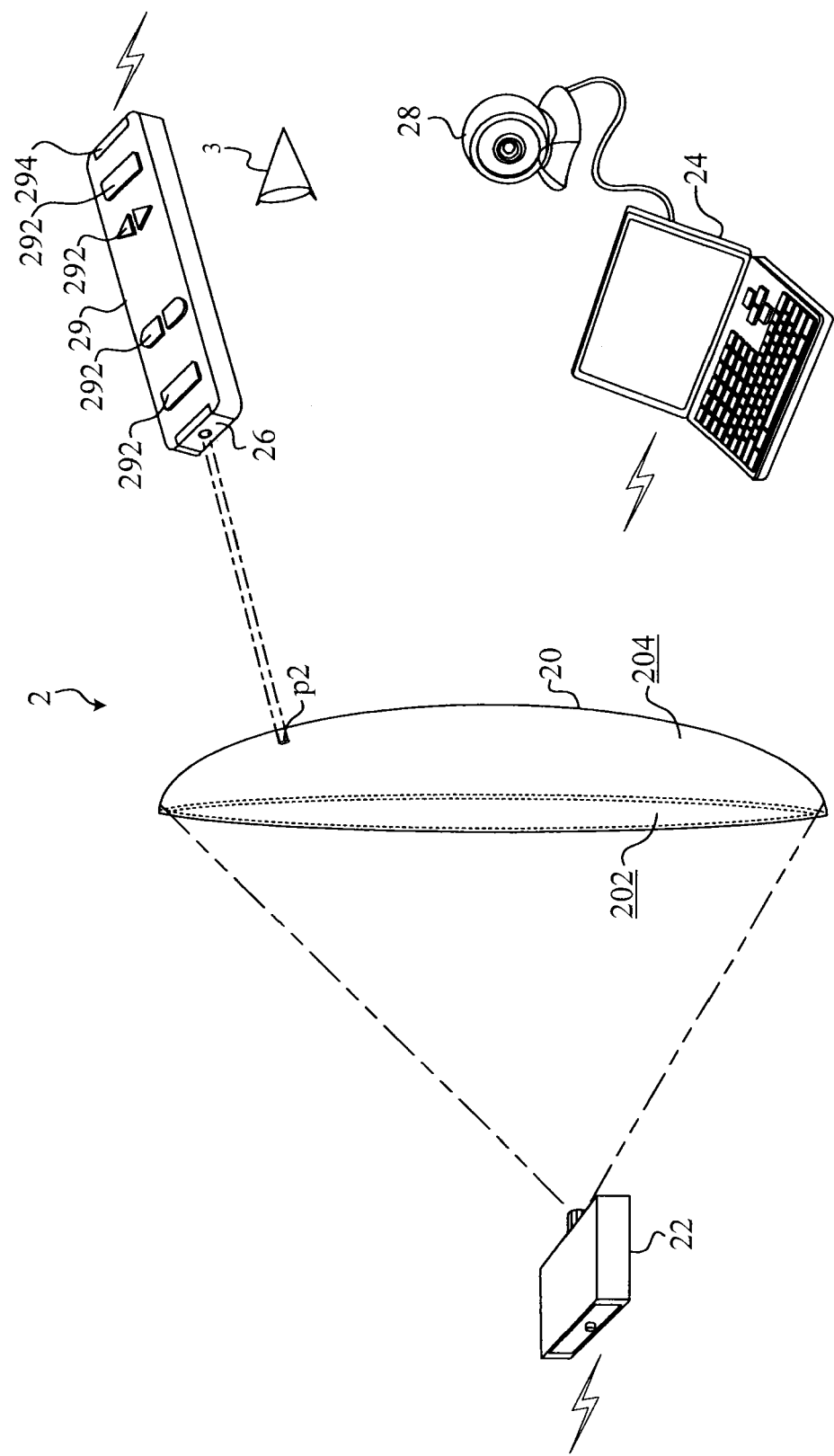
FIG. 4 is a schematic diagram showing the architecture of the interactive simulated-globe display system according to the second preferred embodiment of the invention.

Referring to FIG. 4, FIG. 4 schematically shows the architecture of the interactive simulated-globe display system 2 according to the second preferred embodiment of the invention.

As shown in FIG. 4, the interactive simulated-globe display system 2 includes a translucent hemispheric shell 20, N image-projecting units 22, a data processing unit 24, an optical pointer 26 and M image-capturing units 28 where N and M are respectively a natural number. To illustrate conveniently, only one image-projecting units 22 and one image-capturing units 28 are shown for representation.

In practical application, the data processing unit 24 can be a desktop computer, a notebook computer, a tablet computer, a personal digital assistant, a mobile phone or other apparatus with computation capability.

Similarly, the data processing unit 24 therein stores a plurality of first instructions (such as an instruction for rotating image) and a plurality of position input rules which each corresponds to one of the first instructions.

The data processing unit 24 is capable of communicating with the N image-projecting units 22. The data processing unit 24 functions for projecting, through the N image-projecting units 22, N images onto an inner surface 202 of the translucent hemispheric shell 20. The N images constitute a hemi-globe image of a whole globe image. For example, single image projected by single image-projecting unit 22 constitutes the eastern hemisphere's image of the earth globe image. As shown in FIG. 4, the viewer 3 watches an external surface 204 of the hemispheric shell 20, and thereby, the interactive simulated-globe display system 2 of the invention uses only the hemispheric shell to project the image, which the viewer 3 feel an whole sphere image without imaging blind spot.

The optical pointer 26 functions in projecting an indicated spot p2 onto the external surface 204 of the translucent hemispheric shell 20.

In one embodiment, the indicated spot is a laser spot.

The M image-capturing units 28 are capable of communicating with the data processing unit 24.

In one embodiment, the M image-capturing units 28 are externally connected to or built in the data processing unit 24. For example, as shown in FIG. 4, the image-capturing unit 28 is physically connected to the data processing unit 24.

The data processing unit 24 detects the N images and the indicated spot p2 projected on the translucent hemispheric shell 20 by the M image-capturing units 28. The data processing unit 24 determines a spherical coordinate of the indicated spot p2 on the basis of the N images, and converts the spherical coordinate of the indicated spot p2 into a plane coordinate. The data processing unit 24 detects a track relative to the plane coordinate of the indicated spot p2 at an interval, judges if the track meets one of the position input rules, and if YES, executes the first instruction corresponding to said one position input rule.

For example, the N images constitute the hemispheric image of the earth globe image, the data processing unit 24 judges that moving leftwards of the indicated spot p2 meets the instruction of requesting rotating the earth globe image westwards, at this time, the N images start changing to simulate the image showing westward rotation of the earth globe image. The first instructions also include an instruction of requesting moving the cursor simultaneously with the indicated spot. Thereby, the interactive simulated-globe display system 2 of the invention can make the operator interact with the software executed in the data processing unit 24 to simulate globe image.

Further, as shown in FIG. 4, the interactive simulated-globe display system 2 according to the second preferred embodiment of the invention also includes a wireless instruction transmitting unit 29. The wireless instruction transmitting unit 29 is integrated with the optical pointer 26, and is for transmitting a second instruction to the data processing unit 24 in a wireless transmission way. For example, the wireless instruction transmitting unit 29 as shown in FIG. 4 also includes a plurality of function keys 292 which each corresponds to one of the second instructions. The wireless instruction transmitting unit 29 also includes a switch in charge of permanently turning on the optical indicator 26. The wireless instruction transmitting unit 29 also includes a wireless signal transmitting module 294. When the operator pushes one of the function keys 292 on the wireless instruction transmitting unit 29, the wireless instruction transmitting unit 29 transmits the corresponding second instruction to the data processing unit 24 through the wireless signal transmitting module 294. Thereby, the interactive simulated-globe display system 2 of the invention can make the operator variously interact with the software executed in the data processing unit 24 to simulate globe image, e.g., selecting, pulling, zooming-in, zooming-out, rotating or other instructions for objects in the image, or executing left, right key function of the mouse. In practical application, the data processing unit 24 executes the first instruction and the second instruction at the same time to perform the function which the operator wants In one embodiment, the wireless transmission way used by the wireless instruction transmitting unit 29 can be a Bluetooth transmission way or an infrared transmission way.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An interactive simulated-globe display system, comprising:
    an imaging body, having an external hemispheric surface;
    N image-projecting units, N being a natural number;
    a data processing unit, capable of communicating with the N image-projecting units, and for projecting N images onto the external hemispheric surface of the imaging body through the N image-projecting units, the N images constituting a hemi-globe image of a whole globe image, the data processing unit therein storing a plurality of first instructions and a plurality of position input rules which each corresponds to one of the first instructions;
    an optical pointer, for projecting an indicated spot onto the external hemispheric surface of the imaging body; and
    M image-capturing units, capable of communicating with the data processing unit, wherein the data processing unit detects the N images and the indicated spot projected on the hemispheric surface of the imaging body by the M image-capturing units, determines a spherical coordinate of the indicated spot on the basis of the N images, converts the spherical coordinate of the indicated spot into a plane coordinate, detects a track relative to the plane coordinate of the indicated spot at an interval, judges if the track meets one of the position input rules, and if YES, executes the first instruction corresponding to said one position input rule.

2. The interactive simulated-globe display system of claim 1, further comprising a wireless instruction transmitting unit which is integrated with the optical pointer and is for transmitting a second instruction to the data processing unit in a wireless transmission way.

3. The interactive simulated-globe display system of claim 2, wherein the data processing unit executes the first instruction and the second instruction at the same time to perform a function.

4. The interactive simulated-globe display system of claim 2, wherein the wireless transmission way is a Bluetooth transmission way or an infrared transmission way.

5. The interactive simulated-globe display system of claim 1, wherein the M image-capturing units are externally connected to or built in the data processing unit.

6. An interactive simulated-globe display system, comprising:
    a translucent hemispheric shell;
    N image-projecting units, N being a natural number;
    a data processing unit, capable of communicating with the N image-projecting units, and for projecting N images onto an inner surface of the translucent hemispheric shell through the N image-projecting units, the N images constituting a hemi-globe image of a whole globe image, the data processing unit therein storing a plurality of first instructions and a plurality of position input rules which each corresponds to one of the first instructions;
    an optical pointer, for projecting an indicated spot onto an external surface of the translucent hemispheric shell; and
    M image-capturing units, capable of communicating with the data processing unit, wherein the data processing unit detects the N images and the indicated spot projected on the translucent hemispheric shell by the M image-capturing units, determines a spherical coordinate of the indicated spot on the basis of the N images, converts the spherical coordinate of the indicated spot into a plane coordinate, detects a track relative to the plane coordinate of the indicated spot at an interval, judges if the track meets one of the position input rules, and if YES, executes the first instruction corresponding to said one position input rule.

7. The interactive simulated-globe display system of claim 6, further comprising a wireless instruction transmitting unit which is integrated with the optical pointer and is for transmitting a second instruction to the data processing unit in a wireless transmission way.

8. The interactive simulated-globe display system of claim 7, wherein the data processing unit executes the first instruction and the second instruction at the same time to perform a function.

9. The interactive simulated-globe display system of claim 7, wherein the wireless transmission way is a Bluetooth transmission way or an infrared transmission way.

10. The interactive simulated-globe display system of claim 6, wherein the M image-capturing units are externally connected to or built in the data processing unit.

* * * * *